(12) United States Patent
Weissenborn et al.

(10) Patent No.: US 9,362,771 B2
(45) Date of Patent: Jun. 7, 2016

(54) SYSTEM AND METHOD FOR CONTROLLING AN ENERGY STORAGE DEVICE

(71) Applicant: Robert Bosch GmbH, Stuttgart (DE)

(72) Inventors: Erik Weissenborn, Stuttgart (DE); Holger Rapp, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 211 days.

(21) Appl. No.: 14/364,443

(22) PCT Filed: Oct. 23, 2012

(86) PCT No.: PCT/EP2012/070923
§ 371 (c)(1),
(2) Date: Jun. 11, 2014

(87) PCT Pub. No.: WO2013/091938
PCT Pub. Date: Jun. 27, 2013

(65) Prior Publication Data
US 2014/0340047 A1    Nov. 20, 2014

(30) Foreign Application Priority Data

Dec. 20, 2011   (DE) ............................ 10 2011 089 309

(51) Int. Cl.
*H02J 7/00* (2006.01)
*H02M 7/49* (2007.01)
(Continued)

(52) U.S. Cl.
CPC ........... *H02J 7/0065* (2013.01); *B60L 11/1853* (2013.01); *B60L 11/1864* (2013.01);
(Continued)

(58) Field of Classification Search
USPC .................................................. 320/122, 135
See application file for complete search history.

(56) References Cited

U.S. PATENT DOCUMENTS 5,642,275 A    6/1997  Peng et al.
5,734,565 A    3/1998  Mueller et al.
(Continued)

FOREIGN PATENT DOCUMENTS

CN    102158112    8/2011
DE    3924398      1/1991
(Continued)

OTHER PUBLICATIONS

Park et al., "A Simple and Reliable PWM Synchronization & Phase-Shift Method for Cascaded H-Bridge Multilevel Inverters based on a Standard Serial Communication Protocol," The 2006 IEEE Industry Applications Conference Forty-First IAS Annual Meeting Conference Record of, IEEE, Piscataway, NJ, US, Oct. 1, 2006, pp. 988-994.
(Continued)

*Primary Examiner* — Brian Ngo
(74) *Attorney, Agent, or Firm* — Michael Best & Friedrich LLP

(57) ABSTRACT

The invention relates to a method for controlling an energy storage device that comprises n output connections, wherein n≥2, for producing a supply voltage at each of the output connections, and n energy supply branches, which are each coupled to one of the output connections, wherein each of the energy supply branches comprises a plurality of series-connected energy storage modules that each comprise an energy storage cell module comprising at least one energy storage cell, and a coupling device having coupling elements in a full bridge circuit that is designed to connect or bridge the energy storage cell module selectively in the respective energy supply branch. The method according to the invention comprises the following steps: for a number k of energy storage modules of at least one first energy supply branch, generating a first pulse width modulated control signal for controlling the coupling devices of the respective energy storage modules by comparing a first target value signal with a number 2k first periodic reference signals having a pulse period T, which signals each have a phase shift of T/2k relative to the adjacent first reference signals; and, for a number k of energy storage modules of at least one second energy supply branch, generating a second pulse width modulated control signal for controlling the coupling devices of the respective energy storage modules by comparing a second target value signal with a number 2k of second periodic reference signals having the pulse period T, which each have a phase shift of T/2k relative to the adjacent second reference signals. The second reference signals each have a phase shift of T/4k relative to the first reference signals.

13 Claims, 5 Drawing Sheets

(51) Int. Cl.
  *B60L 11/18* (2006.01)
  *H02M 7/5395* (2006.01)
  *H02M 7/483* (2007.01)

(52) U.S. Cl.
  CPC ............... *H02J7/0024* (2013.01); *H02M 7/49* (2013.01); *H02M 7/5395* (2013.01); *H02M 2007/4835* (2013.01); *Y02T 10/7005* (2013.01); *Y02T 10/7055* (2013.01); *Y02T 10/7061* (2013.01)

(56) References Cited

U.S. PATENT DOCUMENTS

| | | | |
|---|---|---|---|
| 5,744,936 A * | 4/1998 | Kawakami | H01M 10/4207 320/120 |
| 5,933,339 A | 8/1999 | Duba et al. | |
| 6,101,109 A | 8/2000 | Duba et al. | |
| 6,118,932 A | 9/2000 | Maurio et al. | |
| 6,340,851 B1 | 1/2002 | Rinaldi et al. | |
| 2001/0038541 A1 | 11/2001 | Hammond et al. | |
| 2012/0025776 A1* | 2/2012 | Xu | H01M 10/5006 320/129 |
| 2014/0015488 A1* | 1/2014 | Despesse | H01M 10/425 320/122 |

FOREIGN PATENT DOCUMENTS

| | | |
|---|---|---|
| DE | 69908469 | 1/2004 |
| JP | 2000184769 | 6/2000 |
| JP | 2001196244 | 7/2001 |

OTHER PUBLICATIONS

International Search Report for Application No. PCT/EP2012/070923 dated Oct. 24, 2013 (English Translation, 3 pages).

* cited by examiner

SYSTEM AND METHOD FOR CONTROLLING AN ENERGY STORAGE DEVICE

BACKGROUND OF THE INVENTION

The invention relates to a system and a method for controlling an energy storage device, in particular in a battery direct inverter circuit in order to generate an n-phase alternating current voltage.

It is becoming apparent that in the future both in the case of stationary applications, such as for example wind turbines or solar panels, and also in vehicles, such as hybrid or electric vehicles, electronic systems will increasingly be used, which electronic systems combine new energy storage technologies with electrical drive technology.

The supply of multiphase current into an electrical machine is generally provided by means of a converter in the form of a pulse width modulated inverter. For this purpose, a direct current voltage that is provided by a direct current voltage intermediate circuit can be converted into a multiphase alternating current voltage, by way of example a three-phase alternating current voltage. The direct current voltage intermediate circuit is supplied by a string of series-connected battery modules. Several battery modules are frequently connected in series in a traction battery in order to be able to fulfill the relevant requirements relating to performance and energy for a particular application.

A battery system having an integrated inverter function is described in the publication U.S. Pat. No. 5,642,275 A1. Systems of this type are known by the name multilevel cascaded inverter or also battery direct inverter (BDI). Systems of this type comprise direct current sources in several energy storage module strings, which can be connected directly to an electrical machine or an electrical network. Single-phase or multiphase supply voltages can be generated. The energy storage module strings comprise several series-connected energy storage modules, wherein each energy storage module comprises at least one battery cell and an allocated controllable coupling unit that renders it possible in dependence upon control signals to bridge the respective allocated at least one battery cell or to connect the respective allocated at least one battery cell into the respective energy storage module string. Optionally, the coupling unit can be designed so as to render it possible in addition to connect the respective allocated at least one battery cell also having reverse polarity into the respective energy storage module string, or also to disconnect the respective energy storage module string. By virtue of the fact that the coupling units are suitably controlled, for example with the aid of pulse width modulation, it is also possible to provide suitable phase signals for controlling the phase output voltage so that a separate pulse width modulated inverter can be omitted. The pulse width modulated inverter that is required in order to control the phase output voltage is consequently, in a manner of speaking, integrated into the BDI.

BDIs generally comprise a higher efficiency level and are more reliable in comparison to conventional systems. The reliability is ensured, amongst other things, by virtue of the fact that defective battery cells that have failed or are not fully functional can be disconnected from the energy supply strings by virtue of suitably controlling the bridging of the coupling units. The phase output voltage of an energy storage module string can be varied by correspondingly controlling the coupling units and it can in particular be adjusted in steps. The stepped adjustment of the output voltage is determined from the voltage of an individual energy storage module, wherein the maximum possible phase output voltage is determined by the total of the voltages of all of the energy storage modules of one energy storage module string.

Coupling units can be controlled in a pulse width modulated manner (PWM) in order to adjust an output voltage of an energy storage module. As a consequence, it is possible by purposefully varying the switch-on and/or switch-off times to provide a desired mean value as an energy storage module voltage.

A method for controlling several series-connected step-down converters in a pulse width modulated manner is disclosed in the publication DE 39 24 398 A1, in which method all the step-down converters that are series-connected on the output side are operated with the aid of a uniform phase control factor and a uniform pulse width modulated period. The output voltage progressions of the individual step-down converters are in each case offset with respect to one another by a fraction of a control period. As a consequence, it is possible to maintain a total output voltage that comprises a smaller range of fluctuation from its mean value.

With respect to BDIs, there is a need for pulse width modulated controlling methods in which the fluctuation of the total output voltage can be optimized, in particular whilst generating an n-phase output voltage system in an n-phase BDI.

SUMMARY OF THE INVENTION

The present invention provides in accordance with one aspect a method for controlling an energy storage device that comprises: n output connectors, wherein n≥2, for the purpose of providing a supply voltage at each of the output connectors, and n energy supply branches that are coupled in each case to one of the output connectors, wherein each of the energy supply branches comprises several series-connected energy storage modules that in each case comprise an energy storage cell module that comprises at least one energy storage cell, and a coupling device having coupling elements in a full bridge circuit, which coupling elements are designed so as to selectively connect the energy storage cell module into the respective energy supply branch or bridge said energy storage cell module. The method comprises the following steps: generating a first pulse width modulated control signal for a number k of energy storage modules at least of one first energy supply branch for the purpose of controlling the coupling devices of the respective energy storage modules by means of comparing a first desired value signal with a number of 2k first periodic reference signals that comprise a pulse period T and in each case comprise a phase shift of T/2k with respect to adjacent first reference signals, and generating a second pulse width modulated control signal for a number k of energy storage modules at least of one second energy supply branch for the purpose of controlling the coupling devices of the respective energy storage modules by means of comparing a second desired value signal with a number of 2k second periodic reference signals that comprise the pulse period T and in each case comprise a phase shift of T/2k with respect to adjacent second reference signals. The second reference signals comprise in each case a phase shift of T/4k with respect to the first reference signals.

Each of the k energy storage modules of an energy supply branch can preferably be allocated two of the 2k reference signals. Sets of 2k reference signals that differ merely in the sequence of allocation to the k energy storage modules but are identical in other respects are considered hereinunder as identical and not different from one another.

Hereinunder, the pulse period T of a reference signal is further described as "pulse period", whereas the period T/2k of the output voltage of an energy supply branch is described as "partial pulse period".

In accordance with a further aspect, the present invention provides a system having an energy storage device that comprises: n output connectors, wherein n≥2, for the purpose of providing a supply voltage at each of the output connectors, and n energy supply branches that are coupled in each case to one of the output connectors, wherein each of the energy supply branches comprises several series-connected energy storage modules that in each case comprise an energy storage cell module that comprises at least one energy storage cell, and a coupling device having coupling elements in a full bridge circuit, which coupling elements are designed so as to selectively connect the energy storage cell module into the respective energy supply branch or bridge of said energy storage cell module. The system furthermore comprises a control device that is coupled to the coupling devices and that is designed so as to implement a method in accordance with the invention for controlling the energy storage device.

The object of the present invention is to optimize the control strategy of an energy storage device having several phase connectors in order to generate a multiphase supply voltage from several energy storage modules by way of a PWM-method in such a manner that only those voltage space phasors in the system of the energy storage modules that are controlled by way of the PWM control signal are used, which voltage space phasors are closest to the desired voltage space phasor. For this purpose, PWM control signals are generated for different energy supply branches in such a manner that the reference signals that are drawn upon in order to generate said control signals comprise different phase shifts from energy supply branch to energy supply branch. If the phase shift amounts to a fraction of the phase shift, which the reference signals within an energy supply branch comprise amongst themselves, the selection of the voltage space phasors occurs automatically to such an extent that only the voltage space phasors that are directly adjacent to the desired voltage space phasor are drawn upon in order to generate the phase voltages.

One considerable advantage of this approach is that the current fluctuations in the energy storage device and in the consumer that is connected to said energy storage device can be reduced, therefore reducing the load on the switching elements of the energy storage device. Conversely, the switching frequency of the coupling devices of the energy storage device can be reduced in the case of constant level current fluctuations in the energy storage device.

In accordance with an embodiment of the method in accordance with the invention, it is furthermore possible for each of the energy supply branches to determine whether or not the pulse width modulated control signal of the energy supply branch is at a logic "high" potential or a logic "low" potential at the beginning of a partial pulse period.

In a further embodiment, it is advantageously possible to select as second energy supply branches those energy supply branches for which the respective pulse width modulated control signal of the energy supply branch is at a logic "low" potential at the beginning of a partial pulse period. As a consequence, it is possible at the beginning of each pulse period to check, which control strategy for the coupling devices of the energy storage modules is associated with the smallest current fluctuations.

In accordance with a further embodiment of the method in accordance with the invention, the phase shift of the second reference signals can be positive with respect to the first reference signals. Alternatively thereto, in accordance with a further embodiment of the method in accordance with the invention, the phase shift of the second reference signals can be negative with respect to the first reference signals. As a consequence, the sequence of the switching processes can be adjusted in an advantageous manner to suit the control strategy.

In accordance with a further embodiment of the method in accordance with the invention, the first and second reference signals can be triangular signals.

In accordance with a further embodiment of the method in accordance with the invention, the first and second desired value signals can comprise constant signal levels at least during one pulse period.

In accordance with an embodiment of the system in accordance with the invention, the coupling devices comprise power MOSFET switches or IGBT switches.

BRIEF DESCRIPTION OF THE DRAWINGS

Further features and advantages of embodiments of the invention are disclosed in the following description in relation to the attached drawings.

In the drawings.

DETAILED DESCRIPTION

Figure 1:
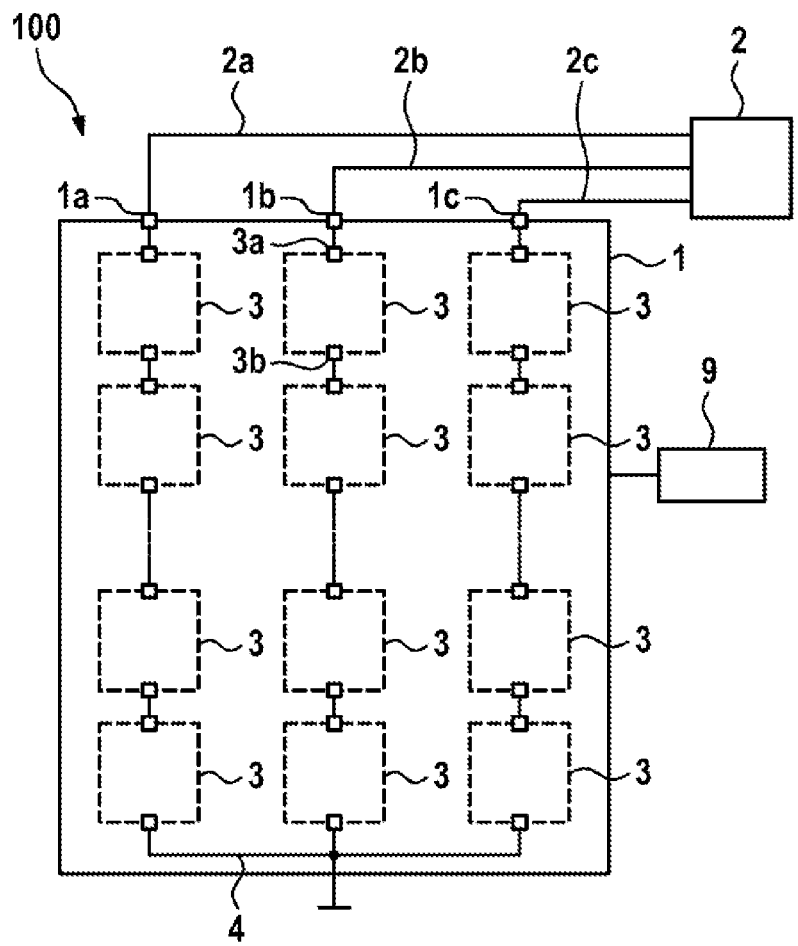
FIG. 1 illustrates a schematic illustration of a system having an energy storage device in accordance with an embodiment of the present invention.

FIG. 1 illustrates a system 100 for inverting voltage from direct current, which is provided by means of energy storage modules 3, into an n-phase alternating current voltage. The system 100 comprises an energy storage device 1 having energy storage modules 3 that are connected in series in energy supply branches. By way of example, FIG. 1 illustrates three energy supply branches that are suitable for generating a three-phase alternating current voltage, by way of example for a three-phase machine 2. However, it is clear that any different number of energy supply branches can likewise be possible. The energy storage device 1 comprises at each energy supply branch a first output connector 1a, 1b, 1c that is connected in each case to phase lines 2a, 2b and/or 2c. By way of example, the system 100 in FIG. 1 is used for supplying a three-phase electrical machine 2. However, it can also be provided that the energy storage device 1 is used in order to generate an electrical current for an energy supply network 2.

The system 100 can furthermore comprise a control device 9 that is connected to the energy storage device 1 and with the aid of which the energy storage device 1 can be controlled in order to provide the desired output voltages at the respective first output connectors 1a, 1b, 1c. Furthermore, the control device 9 can be designed so as to control the respective active switching elements of the energy storage device 1 whilst charging the energy storage cells of the energy storage device 1.

The energy supply branches can be brought together in each case with one end at a common neutral point 4. The potential of this neutral point 4 can be selected by definition as the potential 0. The neutral point 4 can also be connected to the ground potential of the vehicle in an electrically conductive manner.

Each of the energy supply branches comprises at least two series-connected energy storage modules 3. By way of example, the number of the energy storage modules 3 per energy supply branch in FIG. 1 amounts to four, wherein however any different number of energy supply modules 3 is likewise possible. Each of the energy supply branches preferably comprises an equal number of energy storage modules 3, wherein it is however also possible to provide a different number of energy storage modules 3 for each energy supply branch. FIGS. 5 to 12 refer in each case to an exemplary number of four energy storage modules 3 of an energy supply branch of an energy storage device 1. The explanation provided here likewise applies mutatis mutandis for any different number of energy storage modules 3.

The energy storage modules 3 comprise in each case two output connectors 3a and 3b, by way of which an output voltage of the energy storage modules 3 can be provided. Since the energy storage modules 3 are primarily connected in series, the output voltages of the energy storage modules 3 are summated to form the total output voltage that can be provided at the respective one of the first output connectors 1a, 1b, 1c of the energy storage device 1.

Figure 2:
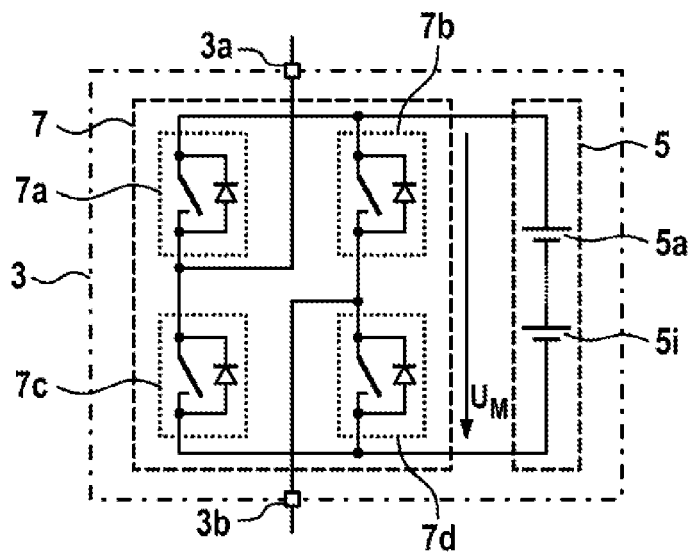
FIG. 2 illustrates a schematic illustration of an energy storage module of an energy storage device in accordance with FIG. 1.

An exemplary construction of the energy storage modules 3 is illustrated in greater detail in FIG. 2. The energy storage modules 3 comprise in each case a coupling device 7 having several coupling elements 7a, 7c and also 7b and 7d. The energy storage modules 3 furthermore comprise in each case an energy storage cell module 5 having one or several series-connected energy storage cells 5.1 to 5.i, wherein i is the number of the series-connected energy storage cells.

The energy storage cell module 5 can comprise, by way of example, series-connected cells 5a to 5i, by way of example lithium-ion cells. The number of the energy storage cells 5a to 5i amounts, by way of example, to two in the energy storage modules 3 that are illustrated in FIG. 2, wherein however any different number of energy storage cells 5a to 5i is likewise possible.

The energy storage cell modules 5 comprise a terminal voltage of $U_M$ and are connected to input connectors of the associated coupling device 7 by way of connecting lines. The voltage $U_M$ therefore prevails at the input terminals of the associated coupling device 7. The series-connected coupling elements 7a and 7c, whose center tap is connected to the output terminals 3a, form the so-called left-hand branch of the full bridge circuit and the series-connected coupling elements 7b and 7d, whose center tap is connected to the output terminal 3b form the so-called right-hand branch of the full bridge circuit. The coupling device 7 is embodied in FIG. 2 as a full bridge circuit having in each case two coupling elements 7a, 7c and two coupling elements 7b, 7d. The coupling elements 7a, 7b, 7c, 7d can in each case comprise an active switching element, by way of example a semiconductor switch and a free-wheeling diode that is connected parallel to this. It can be provided that the coupling elements 7a, 7b, 7c, 7d are embodied as MOSFET switches that already comprise an integral diode.

The coupling elements 7a, 7b, 7c, 7d can be controlled, by way of example with the aid of the control device 9 that is illustrated in FIG. 1, in such a manner that the respective energy storage cell module 5 is selectively connected between the output connectors 3a and 3b or that the energy storage cell module 5 is bridged. In relation to FIG. 2, the energy storage cell module 5 can be connected by way of example in a forward polarity state between the output connectors 3a and 3b in that the active switching element of the coupling element 7d and the active switching element of the coupling element 7a are set into a closed state, whereas the two remaining active switching elements of the coupling elements 7b and 7c are set into an open state. In this case, the voltage $U_M$ prevails between the output terminals 3a and 3b of the coupling device 7. A bridging state can be set by way of example by virtue of the fact that the two active switching elements of the coupling elements 7a and 7b are set into the closed state, whereas the two active switching elements of the coupling elements 7c and 7d are held in the open state. A second bridging state can by way of example be set by virtue of the fact that the two active switches of the coupling elements 7c and 7d are set into the closed state, whereas the active switching elements of the coupling elements 7a and 7b are held in the open state. In the two bridging states, the voltage 0 prevails between the two output terminals 3a and 3b of the coupling device 7. Likewise, the energy storage cell module 5 can be connected in a reverse polarity state between the output connectors 3a and 3b of the coupling device 7, in that the active switching elements of the coupling elements 7b and 7c are set into the closed state, whereas the active switching elements of the coupling elements 7a and 7d are set into the open state. In this case, the voltage $-U_M$ prevails between the two output terminals 3a and 3b of the coupling device 7.

Individual energy storage cell modules 5 of the energy storage modules 3 can therefore be purposefully integrated into the series circuitry of an energy supply branch as a result of suitably controlling the coupling devices 7. As a consequence, a total output voltage can be provided at each of the output connectors 1a, 1b, 1c by virtue of purposefully controlling the coupling devices 7 for the purpose of selectively connecting the energy storage cell modules 5 of the energy storage modules 3 into the energy supply branches, said total output voltage is dependent upon the individual output voltages of the energy storage cell modules 5 of the energy storage modules 3. The total output voltage can be adjusted in each case in steps, wherein the number of the steps is scaled to suit the number of energy storage modules 3 per energy supply branch. In the case of a number of k energy storage modules 3 in an energy supply branch, the total output voltage of the energy supply branch can be adjusted to 2k+1 steps between $-k \cdot U_M, \ldots, 0, \ldots, +k \cdot U_M$.

Figure 3:
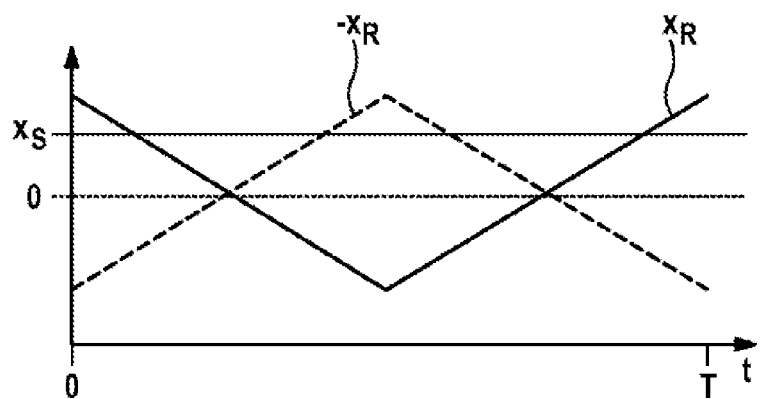
FIG. 3 illustrates a schematic illustration of a PWM control strategy of an energy storage module of an energy storage device.

A sequence of output voltages can be adjusted at each of the output connectors 1a, 1b, 1c by way of a pulse width modulated (PWM)-control, the voltage progression of said output voltages approximates that of a sinusoidal alternating current voltage. For this purpose, a desired sequence of switching processes can be provided for the coupling elements 7a, 7c, and/or 7b, 7d of each half bridge circuit of the energy storage modules 3 by way of a suitable variation of the pulse widths of a PWM-control signal. A possibility of generating a PWM-control signal for one of the energy storage modules 3 is schematically illustrated in FIG. 3.

A desired value signal $x_S$ is compared to a reference signal $x_R$ for this purpose. The reference signal $x_R$ can be a triangular signal that extends between normalized values of $-1$ and $+1$. The desired value signal $x_S$ can likewise have a normalized value between $-1$ and $+1$. A pulse period of the duration T is illustrated, during which the pulse width of a PWM control signal for the left-hand branch of the full bridge circuit and therefore the switching instances of the active switching elements of the left-hand branch of the full bridge circuit are determined by way of comparing the desired value signal $x_S$ and the reference signal $x_R$. If the desired value signal $x_S$ has a greater value than the reference signal $x_R$, the PWM-control signal for the left-hand branch of the full bridge circuit is set to a logic "high" level. This leads to the coupling element 7a being set into an electrically conductive state, whereas the coupling element 7c is set into an electrically non-conductive state. If the desired value signal $x_S$ has a smaller value than the reference signal $x_R$, the PWM-control signal for the left-hand branch is set to a logic "low" level. This leads to the coupling element 7a being set into an electrically non-conductive state, whereas the coupling element 7c is set into an electrically conductive state. The higher the level of the desired signal value $x_S$, the longer the pulse width of the PWM-control signal for the left-hand branch during a pulse period T. The reference signal $x_R$ repeats after a pulse period T.

In a corresponding manner, the pulse width of a PWM-control signal for the right-hand branch of the full bridge circuit and therefore the switching instances of the active switching elements of the right-hand branch of the full bridge circuit are determined by way of comparing the desired value $x_S$ with the reference signal $-x_R$. If the desired value signal $x_S$ has a greater value than the reference signal $-x_R$, the PWM-control signal for the right-hand branch of the full bridge circuit is set to a logic "low" level. This leads to the coupling element 7d being set into an electrically conductive state, whereas the coupling element 7b is set into an electrically non-conductive state. If the desired value signal $x_S$ has a smaller value than the reference signal $-x_R$, the PWM-control signal for the right-hand branch is set to a logic "high" level. This leads to the coupling element 7d being set into an electrically non-conductive state, whereas the coupling element 7b is set into an electrically conductive state. The higher the level of the desired value signal $x_S$, the shorter the pulse width of the PWM-control signal for the right-hand branch during a pulse period T.

If the desired value signal $x_S$ is constant during a pulse period or its temporal progression is at least known, the switching instances for the active switching elements of the coupling elements 7a to 7d of the coupling device 7 can also be directly determined from the desired value signal $x_S$ without the need to constantly calculate the instantaneous values of the reference signals $x_R$ and $-x_R$, in that only the instances, at which during application of the above described method $x_S$ is equal to $x_R$ and at which $x_S$ is equal to $-x_R$ are calculated directly relative to the beginning of the pulse period T of the coupling device 7. These instances are the switching instances for the coupling elements 7a to 7d. In relation to the example that is illustrated in FIG. 3, by way of example, a constant value of $x_S$ equal to $+\frac{2}{3}$ is assumed hereinunder. In this case, the switching state at the beginning of the pulse period T is initially such that the coupling elements 7b and 7d are electrically conductive, whereas the coupling elements 7a and 7c are not electrically conductive. At the point in time T/12, $x_S$ is then equal to $x_R$, wherein $x_R$ continually drops in this first half of the pulse period T. As a consequence, at this point in time, the control signal for the left-hand branch of the full bridge circuit must be switched from the logic "low" level to the logic "high" level. This means that at this point in time, the coupling element 7b is not electrically conductive and the coupling element 7a is set into the electrically conductive state. In a corresponding manner, it is evident that, at the point in time 5T/12, the coupling element 7d is not electrically conductive and the coupling element 7c is set into the electrically conductive state. At the point in time 7T/12, the coupling element 7c is again not electrically conductive and the coupling element 7d is set back into the electrically conductive state. Finally, at the point in time 11T/12, the coupling element 7a is once again not electrically conductive and the coupling element 7b is set back into the conductive state. All these switching instances and the switching processes that are implemented at these switching instances can be calculated from the value of the desired value signal $x_S$ in a simple manner without the need to explicitly calculate the reference signals $x_R$ and $-x_R$.

Figure 4:
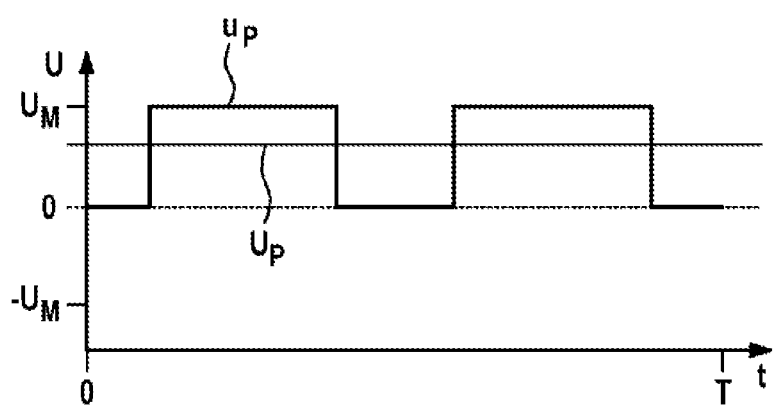
FIG. 4 illustrates a schematic illustration of a potential diagram of the output voltage of an energy storage module of an energy storage device, which is operated with the aid of a PWM-control strategy in accordance with FIG. 4.

As is schematically illustrated in FIG. 4, it is achieved in this manner that the output voltage comprises a progression up that fluctuates between a logic "high" voltage value and a logic "low" voltage value, wherein the logic "low" voltage value at $U_M$ is smaller than the logic "high" voltage value. If $x_S$ is positive, the logic "high" voltage value is therefore equal to $+U_M$, if $x_S$ is negative, the logic "high" voltage level is therefore equal to 0. The output voltage $u_P$ changes twice in the progression of a pulse period T back and forth between the logic "high" and the logic "low" voltage value. As a consequence, the period of the output voltage up is equal to T/2 and therefore already halved with respect to the period T of the reference signals $x_R$ and $-x_R$. Between said logic "high" voltage value and logic "low" voltage value, there is an output direct current voltage $U_P$ as an output voltage of the respective energy storage module 3, wherein the value $U_P$ is scaled to suit the value of the desired value signal $x_S$.

Figure 5:
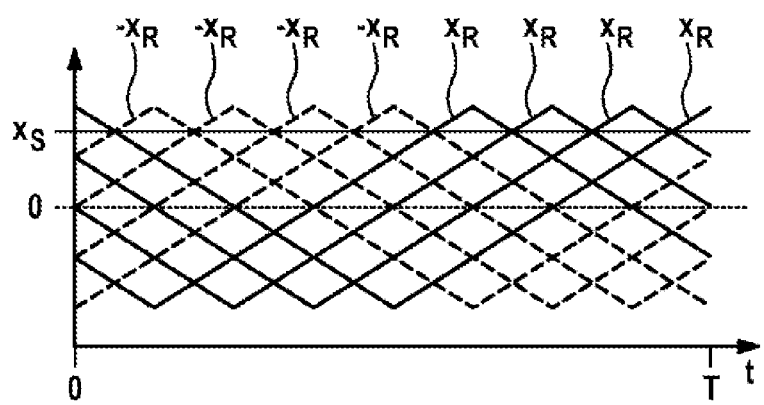
FIG. 5 illustrates a schematic illustration of a PWM-control strategy of an energy storage device having several energy storage modules.

This control strategy can be extended—as is illustrated by way of example in FIG. 5—to several energy storage modules 3 per energy supply branch. For this purpose, a desired value signal $x_S$ is determined for the energy supply branch, which is scaled to suit the desired output voltage of the energy supply branch. A dedicated reference signal $x_R$ is produced for each of the energy storage modules 3, which reference signals in each case comprise a phase shift with respect to the adjacent reference signals $x_R$ of the respective energy supply branch. FIG. 5 illustrates, by way of example, the case for k=4 energy storage modules 3 per energy supply branch, wherein the control strategy can also be generalized for different values of k. The reference signals $x_R$ of the k energy storage modules 3 are in each case displaced with respect to one another by T/2k.

As a consequence, a system of 2k reference signals $x_{R1}$ to $x_{Rk}$ and $-x_{R1}$ to $-x_{Rk}$ is created. The allocation of the respective reference signal pairs $x_R$ and $-x_R$ can be permutated in a user defined manner to the k energy storage modules 3.

Figure 6:
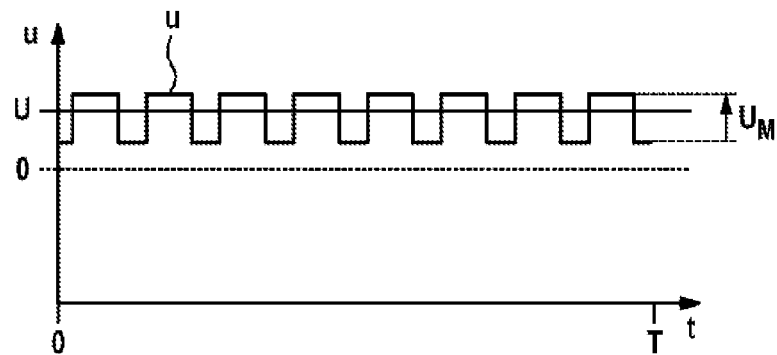
FIG. 6 illustrates a schematic illustration of a potential diagram of the output voltage of an energy storage device having several energy storage modules, which is operated with the aid of a PWM-control strategy in accordance with FIG. 5.

If pulse width modulated control signals are generated now for the respective energy storage modules 3 of an energy supply branch by way of comparing the desired value signal $x_S$ with respective associated reference signals $x_R$ and $-x_R$, a time-stepped arrangement of individual control signals is therefore created, which control signals generate a voltage progression u at the output of the energy supply branch that is schematically illustrated in FIG. 6. The system of reference signals $x_R$ therefore determines an output voltage at the output of the energy supply branch whose range of fluctuation is equal to that of the output voltage $U_M$ of an energy storage cell module 5. The output voltage fluctuates between a higher voltage value and a lower voltage value that is less than the higher voltage value by the value $U_M$, wherein these two voltage values are integer multiples of $U_M$ and the average output voltage U to $x_S \cdot k \cdot U_M$ is produced. A period of T/2k is produced for the period of the changing proportion of the output voltage progression as a result of the time-stepped arrangement of the reference signals $x_R$. However, if the output voltage of the energy supply branch had been generated by means of a branch of a conventional pulse width modulated inverter, this branch would therefore—in the case of an equal output voltage adjusting range—have had to be supplied with an input voltage of $2k \cdot U_M$. The range of fluctuation of its output voltage during a pulse period of the duration T amounts then to $2k \cdot U_M$, the period of the changing proportion of this output voltage is T.

Figure 7:
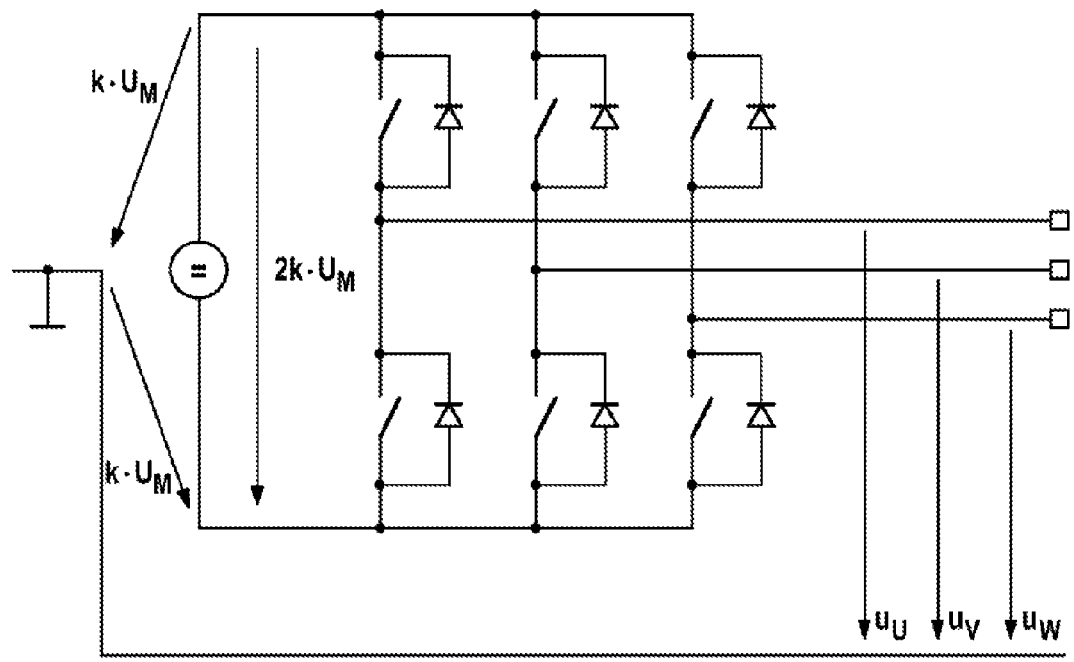
FIG. 7 illustrates a schematic illustration of a pulse width modulated inverter.

FIG. 7 illustrates a schematic illustration of a conventional pulse width modulated inverter having the input voltage $2k \cdot U_M$, wherein the negative input terminal comprises the potential $-kU_M$ with respect to a potential 0 and the positive input terminal comprises the potential $+kU_M$.

The current fluctuations of the above described battery direct inverter in conjunction with the described PWM-method thus reduce by a factor of $\frac{1}{2}k * \frac{1}{2}k = (\frac{1}{2}k)^2$ with respect to a conventional pulse width modulated inverter that is operated with the aid of identical PWM-periods T, said pulse width modulated inverter having an identical output adjusting range, so that the switching frequency can be reduced with respect to a conventional control strategy, without the current fluctuations exceeding predefined threshold values.

As has already been explained during the description of the PWM-method for a coupling device 7, the switching processes that are to be implemented in each case during the next partial pulse period of the duration T/2k can be determined depending on the type and point in time without having to permanently calculate the temporal progression of the reference signals $x_R$ for this purpose. For this purpose, only the temporal progression of the desired value signal $x_S$ is known during the next partial pulse period of the duration T/2k. This temporal progression is preferably constant during a partial pulse period of a duration T/2k. In the event of a change in the desired value signal $x_S$ at the beginning of a new partial pulse period of the duration T/2k, additional switching processes can be triggered at this point in time. The type of these switching processes can also be determined without explicit constant calculation of the reference signals $x_R$, if the value of the desired value signal $x_S$ is known in each case in the preceding and in the newly beginning partial pulse period.

Figure 8:
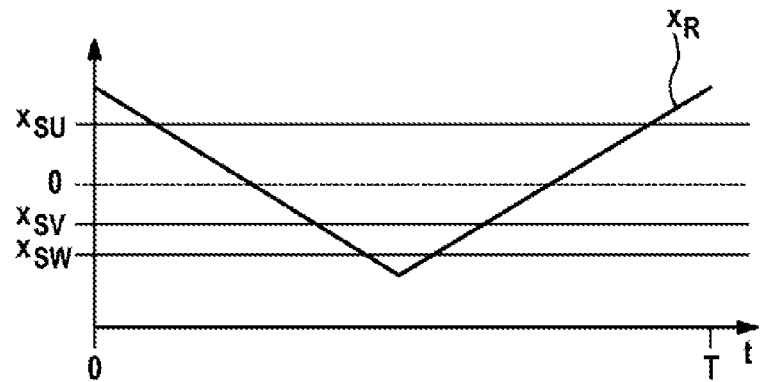
FIG. 8 illustrates a schematic illustration of a PWM-control strategy of an energy storage device having several energy supply branches.
Figure 8:
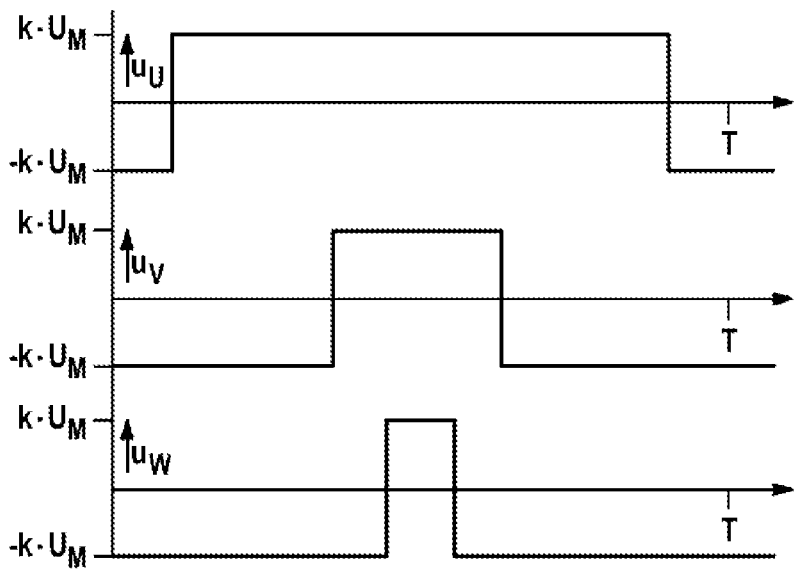

FIG. 8 illustrates a schematic illustration of a control strategy for three different energy supply branches of a pulse width modulated inverter in accordance with FIG. 7 that is supplied with the input voltage $2k \cdot U_M$. The number of three is exemplary, and it is also likewise possible to control a different number of energy supply branches with the aid of the control strategy that is illustrated in FIG. 8. In order to maintain an n-phase supply voltage system at the outputs of n energy supply branches, each of the energy supply branches can be operated with the aid of a different desired value signal. By way of example, a first energy supply branch can be operated with the aid of a desired value signal $x_{SU}$, a second energy supply branch can be operated with the aid of a desired value signal $x_{SV}$, and a third energy supply branch can be operated with the aid of a desired value signal $x_{SW}$. Since each energy supply branch is embodied from a half bridge circuit having a center tap, it is not necessary to compare the respective desired value signal $x_S$ with the reference signal $-x_R$. This results in a system of output voltages $u_U$, $u_V$ and $u_W$ whose temporal progressions during a pulse period of a duration T are likewise illustrated in FIG. 8. The resulting combinations of output voltage values $u_U$, $u_V$ and $u_W$ are illustrated by means of the space phasor diagram in FIG. 9. The output voltages $u_U$, $u_V$ and $u_W$ produce a neutral voltage system that by way of example can be applied for the purpose of supplying energy to a three-phase electrical machine 2 at stator terminals of the electrical machine 2. Voltage space phasors are produced at these stator terminals, which voltage space phasors are schematically illustrated in FIG. 9.

Figure 9:
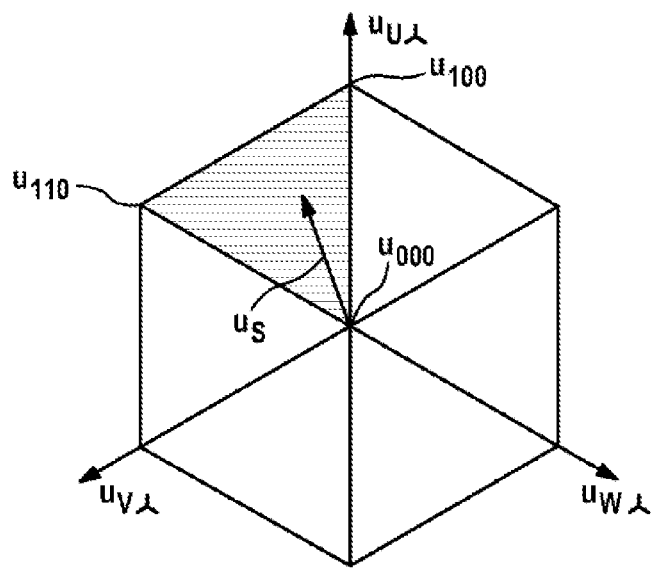
FIG. 9 illustrates a schematic illustration of a voltage space phasor diagram of an energy storage device having several energy supply branches, which is operated with the aid of a PWM-control strategy in accordance with FIG. 8.

The voltage phasor diagram in FIG. 9 illustrates different voltage values $u_{xyz}$ for energy supply branches having in each case an energy storage module 3, wherein the indices x, y and z can assume the value 0 or 1, depending upon whether the respective energy supply branch is controlled directly with the aid of a PWM-control signal having a logic "high" level or with the aid of a PWM-control signal having a logic "low" level. By way of example, the voltage space phasor $u_{100}$ is a state in which one of the energy supply branches directly produces the output voltage $u_U = +kU_M$ whilst the other two energy supply branches produce the output voltage $-kU_M$. In order to be able to follow the desired value voltage space phasor $u_S$, it is advantageous in each case to use voltage space phasors that lie directly adjacent to the desired value voltage space phasor $u_S$. In the example illustrated in FIG. 9, the desired value voltage space phasor $u_S$ lies in the area that is spanned by the voltage space phasor $u_{100}$, $u_{110}$ and $u_{000}$, which area is marked by the shaded area. If only these voltage space phasors $u_{100}$, $u_{110}$ and $u_{000}$ are drawn upon in order to generate the desired value voltage space phasor $u_S$, the range of the current and/or the voltage fluctuation of the output voltages of the energy supply branches is minimal.

Figure 10:
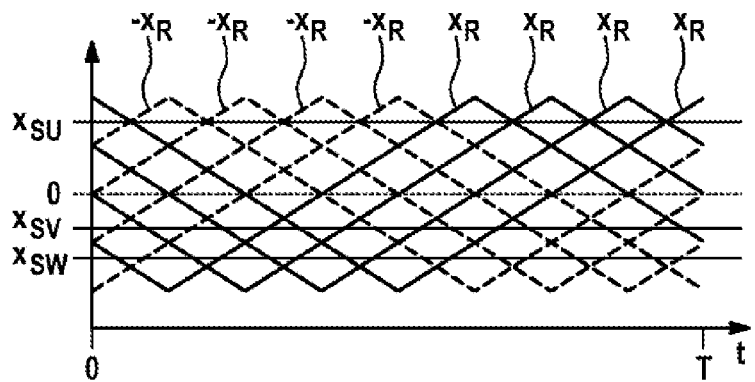
FIG. 10 illustrates a schematic illustration of a control strategy of an energy storage device having several energy supply branches, which comprise in each case several energy storage modules.
Figure 11:
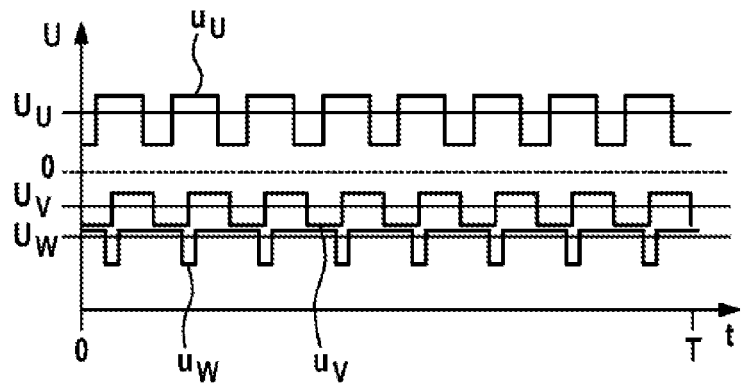
FIG. 11 illustrates a schematic illustration of a potential diagram of the output voltage of an energy storage device having several energy supply branches, which comprise in each case several energy storage modules, wherein the energy storage device is operated with the aid of a PWM-control strategy in accordance with FIG. 10.

FIG. 10 illustrates a schematic illustration of an extended control strategy for a battery direct inverter having three energy supply branches having in each case k=4 energy storage modules. Three desired voltage signals $x_{SU}$, $x_{SV}$ and $x_{SW}$ are again used for the different energy supply branches that are compared to a phase time-shifted stepped system of reference signals $x_R$ per energy storage module in order to generate the PWM-control signals. The voltage progressions at the outputs of the energy supply branches are schematically illustrated in FIG. 11. A voltage progression $u_U$ occurs at a first energy supply branch, a voltage progression $u_V$ occurs at a second energy supply branch and a voltage progression $u_W$ occurs at a third energy supply branch.

Figure 12:
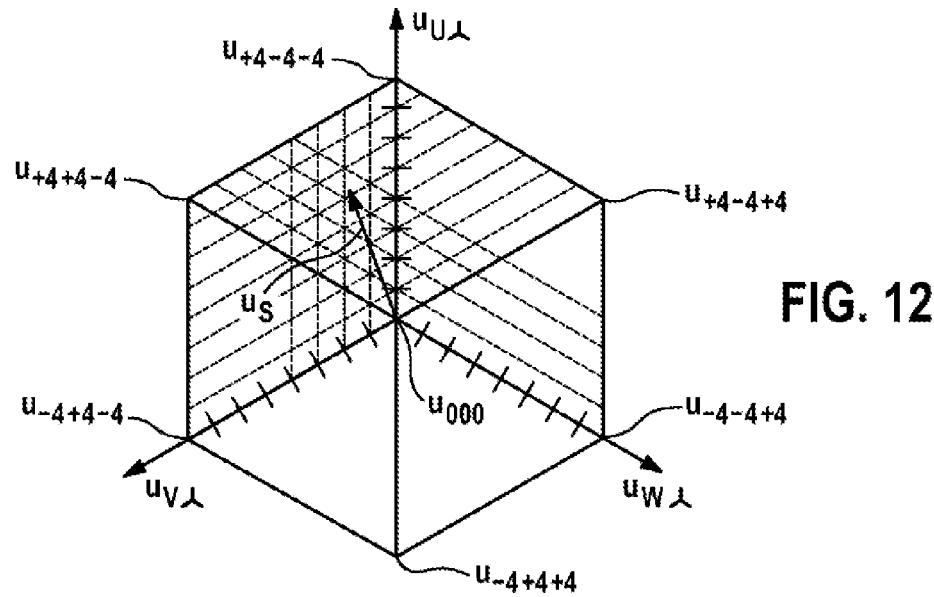
FIG. 12 illustrates a schematic illustration of a voltage space phasor diagram of an energy storage device having several energy supply branches which comprise in each case several energy storage modules, wherein the energy storage device is operated with the aid of a PWM-control strategy in accordance with FIG. 10.

FIG. 12 illustrates the voltage phasor diagram from FIG. 9 extended to a battery direct inverter having three energy supply branches having in each case k=4 energy storage modules 3. Different voltage values $u_{xyz}$ for energy supply branches having in each case k=4 energy storage modules 3 are described, wherein the indices x, y and z can assume an integer value between −4 and +4 depending on how many of the respective energy storage modules 3 of the respective energy storage branch with a positive or a negative individual module voltage contribute directly to the output voltage. By way of example, the voltage space phasor $u_{+4-2-2}$ is a state in which one of the energy supply branches directly produces the output voltage $u_U=4U_M$ including all the k=4 energy supply modules 3, whereas the other two energy supply branches produce in each case the output voltages $u_V=-2U_M$ and $u_W=-2U_M$ including in each case two energy storage modules 3.

In turn, it is desirable to represent the desired value voltage space phasor $u_S$ by the voltage space phasors that lie closest to the desired value voltage space phasor $u_S$. If the same set of reference signals $x_R$ is used for the reference signals $x_R$ in FIG. 10 for each of the energy supply branches, in other words, reference signals $x_R$ that comprise the identical phase shifts in relation to the other energy supply branches, it can thus occur that, for particular desired value voltage space phasors $u_S$, voltage space phasors are used that do not lie closest to the desired value voltage space phasor $u_S$. By way of example, the voltage space phasors $u_{+2-1+2}$ and $u_{+3-1+3}$ and $u_{+20-2}$ that clearly lie further removed from the desired value voltage space phasor $u_S$ than the actual preferred voltage space phasor $u_{+2-1+2}$ are used instead of the voltage space phasor $u_{+2-1+2}$ for the purpose of representing a desired value voltage space phasor $u_S$ that lies in the triangular area between the voltage space phasors $u_{+3-1+2}$, $u_{+2-1+2}$ and $u_{+2-1-3}$. As a consequence, the voltage fluctuations in the output voltages of the energy supply branches also increase.

The cause of this problem is due to the fact that for a three-phase BDI such as is illustrated in FIG. 1, in particular time spans during a pulse period T/2k, the output voltages of the three energy supply branches switch back and forth between two different values. In depending upon a respective desired value signal, it is possible that at the beginning of the partial pulse period T/2k first the higher of the two used output voltages is present, which higher output voltage is decreased during the course of the first half of the partial pulse period to the lower of the output voltages, in order then to return to the higher of the two used output voltages during the course of the second half of the partial pulse period T/2k. Likewise, it is possible in particular other partial pulse periods for the exact opposite scenario to occur, wherein the lower of the output voltages is switched to the higher output voltage and back again. Depending on the combination of the desired value signals $x_{SU}$, $x_{SV}$ and $x_{SW}$ for the different energy supply branches, it is possible that during the first half of a partial pulse period, the low output voltage is switched to a high output voltage in some energy supply branches, whereas the opposing switching process occurs from a higher output voltage to a lower output voltage in the respective other one of energy supply branches.

It can be established in the system of the reference signals $x_R$ that the first switching process of a pulse period always then occurs from the higher output voltage to the lower output voltage if the first of the reference signals that intersects the desired value signal $x_S$ increases, in other words comprises a positive gradient. Conversely, the first switching process of a pulse period always then occurs from the lower output voltage to the higher output voltage if the first of the reference signals that intersects the desired value signal $x_S$ falls, in other words comprises a negative gradient. If, in other words, at the beginning of each pulse period it is determined for each of the energy supply branches whether the first switching process occurs from the higher output voltage to the lower output voltage or from the lower output voltage to the higher output voltage, the phase shifts of the respective reference signal systems of the different energy supply branches can be adjusted for the less favorable of the two cases. If the first switching process occurs from the higher output voltage to the lower output voltage, the reference signal system of the corresponding energy supply branch can thus be left unchanged. However, if the first switching process would occur from the lower output voltage to the higher output voltage, the reference signal system of the reference signals $x_R$ of the corresponding energy supply branch can thus be displaced by a time offset of T/4k with respect to the reference signal systems of the other energy supply branches, which reference signal systems remain unchanged. In other words, the reference signals $x_R$ of the corresponding energy supply branch are displaced by T/4k in a negative direction or a positive direction on the time axis. As a consequence, a time interval of the duration T/4k is either skipped or repeated once.

Using this approach, it can be achieved that the first switching process in all energy supply branches occurs in a uniform manner from the high output voltage to the low output voltage so that only the voltage space phasors that lie closest to the desired value voltage space phasor $u_S$ are used. This means that the voltage and/or current fluctuations in the output voltages of the individual energy supply branches can be kept to a minimum.

It is, of course, also possible that the reference signal system of the reference signals $x_R$ of the corresponding energy supply branch can be displaced by T/4k with respect to the reference signal systems of the other energy supply branches, which reference signals remain unchanged, if the first switching process had been performed from the higher output voltage to the lower output voltage. In this case, the first switching process is then performed in all energy supply branches from the low output voltage to the high output voltage in a uniform manner. The direction of the temporal displacement by T/4k along the time axis can likewise be selected in a different manner, whereby merely different switching processes are performed at the point in time of the displacement of the reference signal system, the use of the voltage space phasors that lie closest to the desired value voltage space phasor $u_S$ is however maintained. In general, each phase shift of T/4k+i*T/2k is possible for the displacement of the reference signal system, wherein i is an integer value.

Figure 13:
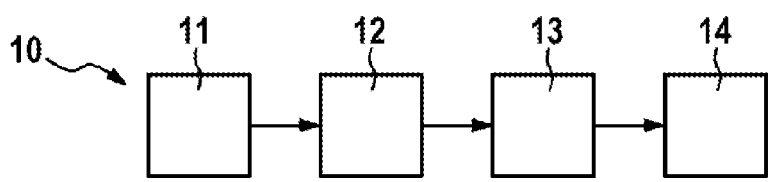
FIG. 13 illustrates a schematic illustration of a method for controlling an energy storage device in accordance with an embodiment of the present invention.

FIG. 13 illustrates a schematic illustration of a method 10 for controlling an energy storage device, by way of example the energy storage device 1 in FIG. 1. The method 10 can be implemented by way of example by means of the control device 9 in FIG. 1. As a first optional step 11 for each of the energy supply branches, the method 10 can comprise a step of determining whether the pulse width modulated control signal of the energy supply branch is at a logic "high" potential or a logic "low" potential at the beginning of a partial pulse period. In dependence upon the particular circumstances, it is possible in a step 12 to select the energy supply branches for which the respective pulse width modulated control signal of the energy supply branch is at a logic "low" potential at the beginning of a partial pulse period can be carried out. These energy supply branches can be described as second energy supply branches, the energy supply branches that are not selected can be described as first energy supply branches.

In a step 13, a first pulse width modulated control signal is generated for a number k of energy storage modules at least of one first energy supply branch, for the purpose of controlling the coupling devices of the respective energy storage modules by means of comparing a first desired value signal with a number of 2k first periodic reference signals that comprise a pulse period T, which periodic reference signals in each case comprise a phase shift of T/2k with respect to adjacent first reference signals. Simultaneous to this, in a step 13, a second pulse width modulated control signal is generated for a number k of energy storage modules at least of one second energy supply branch for the purpose of controlling the coupling devices of the respective energy storage modules by means of comparing a second desired value signal with a number of 2k second periodic reference signals that comprise a pulse period T, which periodic reference signals in each case comprise a phase shift of T/2k with respect to adjacent second reference signals. The second reference signals comprise in each case a phase shift of T/4k with respect to the first reference signals.

Using this approach, it can be ensured that always those voltage space phasors that lie closest to the desired value voltage space phasor are used for representing a desired value voltage space phasor. As a consequence, the current and voltage fluctuations in an energy storage device can be reduced to a minimum, as is illustrated in FIG. 1.

As is described above, it is particularly advantageous to select whether the reference signal system of an energy supply branch is to be displaced on the time axis or not and, based on this decision, to possibly implement a displacement of this reference signal system by T/4k on the time axis in each case at the beginning of each partial pulse width period. In addition, it is advantageous to keep the desired value signals $x_S$ of the energy supply branches constant in each case within a partial pulse period of the duration T/2k.

The method can be adapted in a simple manner to suit battery inverter arrangements in which the coupling devices 7 are not embodied as full bridge circuits rather only as half bridge circuits. In this case, with respect to the illustration in FIG. 2, the coupling elements 7b and 7d are omitted and the output terminal 3b is connected to the negative pole or to the positive pole of the energy storage cell module 5 instead of to the now omitted center tap of the right-hand branch of the full bridge circuit. Since, now of course, the switching processes for the right-hand branch of the full bridge circuit are also omitted, all k reference signals become $-x_R$. The remaining k reference signals $x_R$ are then no longer offset by T/2k rather only by T/k with respect to the in each case adjacent reference signals. The duration of a partial pulse period doubles in this case to T/k. Correspondingly, the displacement of T/2k then occurs between a first system of reference signals and a second system of reference signals.

The invention claimed is:

1. A method (10) for controlling an energy storage device (1) that comprises: n output connectors (1a, 1b, 1c), wherein n≥2, for the purpose of providing a supply voltage at each of the output connectors (1a, 1b, 1c), and n energy supply branches that are coupled in each case to one of the output connectors (1a, 1b, 1c), wherein each of the energy supply branches includes several series-connected energy storage modules (3) that in each case include an energy storage cell module (5) that includes at least one energy storage cell (5a, 5k), and a coupling device (7) having coupling elements (7a, 7b, 7c, 7d) in a full bridge circuit, which coupling elements are designed so as configured to selectively connect the energy storage cell module (5) into the respective energy supply branch or bridge of said energy storage cell module, wherein the method (10) comprises the steps of:

generating (13) a first pulse width modulated control signal for a number k of energy storage modules (3) of a first energy supply branch for the purpose of controlling the coupling devices (7) of the respective energy storage modules (3) by comparing a first desired value signal ($x_{SU}$) with a number of 2k first periodic reference signals ($x_R$) that comprise a pulse period T, which periodic reference signals that in each case comprise a phase shift of T/2k with respect to adjacent first reference signals ($x_R$); and generating (14) a second pulse width modulated control signal for a number k of energy storage modules (3) of a second energy supply branch for the purpose of controlling the coupling devices (7) of the respective energy storage modules (3) by comparing a second desired value signal ($x_{SV}$; $x_{SW}$) with a number of 2k second periodic reference signals ($x_R$) that comprise the pulse period T, which periodic reference signals in each case comprise a phase shift of T/2k with respect to adjacent second reference signals ($x_R$), wherein the second reference signals comprise in each case a phase shift of T/4k with respect to the first reference signals.

2. The method (10) as claimed in claim 1, further comprising determining (11) for each of the energy supply branches whether the pulse width modulated control signal of the energy supply branch is at a logic "high" potential or a logic "low" potential at the beginning of a partial pulse period (T/2k).

3. The method (10) as claimed in claim 2, further comprising selecting (12) as second energy supply branches those energy supply branches for which the respective pulse width modulated control signal of the energy supply branch is at a logic "low" potential at the beginning of a partial pulse period (T/2k).

4. The method (10) as claimed in claim 2, further comprising selecting (12) as second energy supply branches the energy supply branches for which the respective pulse width modulated control signal of the energy supply branch is at a logic "high" potential at the beginning of a partial pulse period (T/2k).

5. The method (10) as claimed in claim 1, wherein the phase shift of the second reference signals is positive with respect to the first reference signals.

6. The method (10) as claimed in claim 1, wherein the phase shift of the second reference signals is negative with respect to the first reference signals.

7. The method (10) as claimed in claim 1, wherein a change from a system of first reference signals to a system of second reference signals and conversely, always takes place by displacing the previously used system of reference signals by half a partial pulse period on the time axis in the negative direction or always by displacing the previously used system of reference signals by a half partial pulse period (T/4k) on the time axis in the positive direction.

8. The method (10) as claimed in claim 1, wherein the first and second reference signals ($x_R$) are triangular signals.

9. The method (10) as claimed in claim 1, wherein the first and second desired value signals ($x_{SU}$; $x_{SV}$; $x_{SW}$) comprise a constant signal level at least over one partial pulse period (T/2k).

10. The method (10) as claimed in claim 1, wherein resulting types and points in time of the switching processes are calculated directly without the need to permanently calculate the reference signals $x_R$ and $-x_R$.

11. A system (100), having:
- an energy storage device (1) including
    - n output connectors (1*a*, 1*b*, 1*c*), wherein n≥2, for providing a supply voltage at each of the output connectors (1*a*, 1*b*, 1*c*); and
    - n energy supply branches that are coupled in each case to one of the output connectors (1*a*, 1*b*, 1*c*), wherein each of the energy supply branches comprises several series-connected energy storage modules (3) that include an energy storage cell module (5) including at least one energy storage cell (5*a*, 5*k*), and
    - a coupling device (7) having coupling elements (7*a*, 7*b*, 7*c*, 7*d*) in a full bridge circuit, which coupling elements are designed to selectively connect the energy storage cell module (5) into the respective energy supply branch or bridge of said energy storage cell module; and
- a control device (9) that is coupled to the coupling devices (7) and that is configured to implement a method (10) for controlling the energy storage device (1) as claimed in claim 1.

12. The system (100) as claimed in claim 11, wherein the coupling devices (7) comprise power MOSFET switches.

13. The system (100) as claimed in claim 11, wherein the coupling devices (7) comprise power IGBT switches.

* * * * *